Dec. 1, 1925.

W. LYONS

GRAIN DRILL SHARE

Filed July 17, 1924

1,564,083

Inventor
W. Lyons
By Jn. Imrie
Atty.

Patented Dec. 1, 1925.

1,564,083

UNITED STATES PATENT OFFICE.

WILLIAM LYONS, OF ROSEBERY EAST, VICTORIA, AUSTRALIA.

GRAIN-DRILL SHARE.

Application filed July 17, 1924. Serial No. 726,600.

*To all whom it may concern:*

Be it known that I, WILLIAM LYONS, farmer, a subject of the King of Great Britain and Ireland, and a resident of the post town of Rosebery East, in the shire and county of Karkarooc, State of Victoria, Commonwealth of Australia (whose post-office address is Rosebery East, in the shire and county of Karkarooc, State of Victoria, Commonwealth of Australia), have invented a certain new and useful Improved Grain-Drill Share, of which the following is a specification.

This invention relates to agricultural implements of the type known as combined cultivators and sowers and to similar machines such as seed and fertilizer drills.

An objection to existing machines of the kind indicated is that the seed and/or fertilizer is delivered to the ground in a thin line or row with the result that it is too congested and in wet or heavy soils particularly the growth of the crop is detrimentally affected and considerable of the grain and fertilizer is wasted.

The object of the present invention is to overcome the above objection by the provision of simple and inexpensive means whereby a wider furrow or channel is formed and the seed and/or fertilizer is spread sidewardly over a broader area than hitherto so that more effective sowing and better crop results are obtained.

Referring to the drawings which form part of this specification:—

Figure 1:
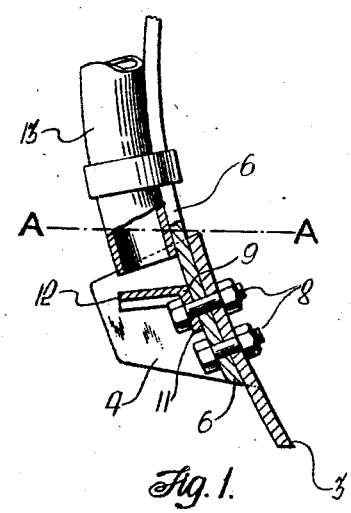
Figure 1 is a sectional side view showing a spreading device in accordance with the invention applied to the lower end of a tine of a combined cultivating and sowing machine.

The invention includes a share 2 having a widened toe or point 3 and rearwardly diverging side wings 4 which are adapted to extend behind the tine 6, (Figures 1 to 4) of a combined cultivator and sower or the hoe 7, (Figure 5) of a drill to which said share 2 is secured by bolts or the like 8 passing through bolt holes in the tine or hoe and in the front of the share between said side wings 4.

Behind the share 2 and between the side wings 4 thereof is a rearwardly projecting spreader or deflector 9 which may be secured to the share and to the tine 6 or hoe 7 by one of the aforesaid bolts 8 which thus passes through the share, the tine or the hoe and a downwardly extending front end portion 11 of the spreader 9.

Figure 2:
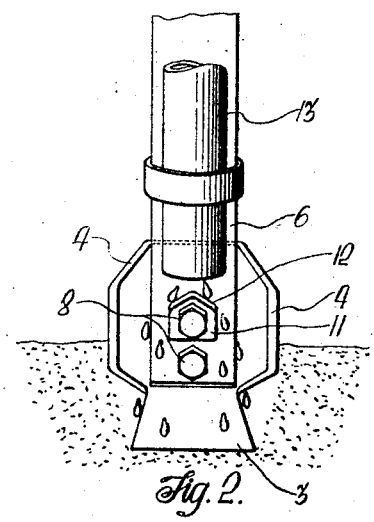
Figure 2 is a rear view of the arrangement shown in Figure 1 and depicts the spreading device in actual use.
Figure 3:
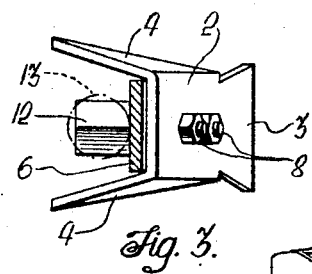
Figure 3 is a sectional plan taken on line A—A of Figure 1. The sowing tube is indicated in broken lines.
Figure 4:
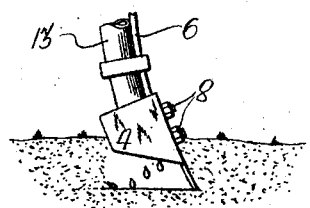
Figure 4 is a side view on a reduced scale showing the arrangement seen in Figures 1 to 3 in use.
Figure 5:
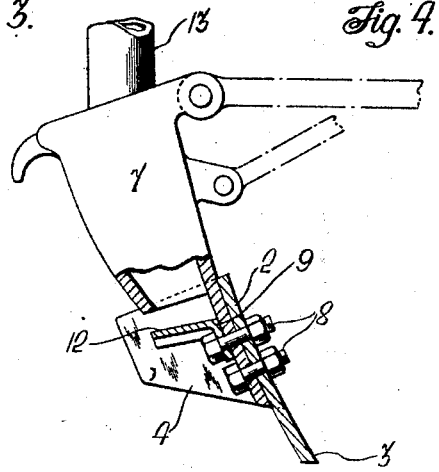
Figure 5 is a part sectional side view showing the invention applied to a hoe of a seed and fertilizer drill.

A rearwardly extending portion 12 of said spreader 9 is disposed beneath the discharge end of the delivery or sowing tube 13 through which the seed and/or fertilizer passes to the ground. This rearwardly extending part 12 of the spreader may be of any desired width and its upper face is preferably bevelled or inclined downwardly towards either side from its centre as seen in Figure 2. Thus when the seed and/or fertilizer passes from the sowing or delivery tube 13 onto the spreader 9 it is deflected sidewardly into the widened furrow formed by the aforesaid share 2 as seen in Figures 2 and 4. The furrow is kept open by the rearwardly diverging wings 4 of the share 2 until the material has been delivered into the furrow whereupon the earth falls in behind said wings to thereby cover the seed or fertilizer.

If desired, the land may be harrowed in the usual manner after the sowing operation to more thoroughly cover the seed.

By the invention the seed and fertilizer is effectively spread out over a wider area in the furrow with the result that the material is not congested and the best fertilizing and crop results are obtained. Furthermore the invention is simple and inexpensive in construction and is readily applicable to existing machines of the kind indicated.

Having now described my invention what I claim as new and desire to secure by Letters Patent is:—

A detachable share for a grain drill tube and its connected tine, comprising a share having rearwardly extending and outwardly divergent side walls, and means for securing the share to the tine, the share extending below the lower edge of the tine with its side edges downwardly divergent.

In testimony thereof I affix my signature.

WILLIAM LYONS.